United States Patent
Lee et al.

(10) Patent No.: US 7,394,882 B2
(45) Date of Patent: Jul. 1, 2008

(54) DIGITAL COMMUNICATION SYNCHRONIZATION SYSTEM AND METHOD THEREOF

(75) Inventors: Seung-Hwan Lee, Daejeon (KR); Eung-Bae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 922 days.

(21) Appl. No.: 10/026,618

(22) Filed: Dec. 27, 2001

(65) Prior Publication Data

US 2003/0095617 A1    May 22, 2003

(30) Foreign Application Priority Data

Nov. 21, 2001    (KR) ............................... 2001-72602

(51) Int. Cl.
    *H04L 7/00*    (2006.01)
(52) U.S. Cl. ...................... 375/354; 375/316
(58) Field of Classification Search ................ 375/316, 375/324, 325, 326, 340, 346, 354, 327, 328, 375/341, 344, 345, 150; 329/360
See application file for complete search history.

(56) References Cited

U.S. PATENT DOCUMENTS

| | | | | |
|---|---|---|---|---|
| 4,578,800 A * | 3/1986 | Yasuda et al. | ................ | 375/354 |
| 4,794,624 A | 12/1988 | Braun et al. | | |
| 5,241,545 A | 8/1993 | Kazecki et al. | | |
| 5,425,057 A * | 6/1995 | Paff | ........................... | 375/326 |
| 5,550,869 A * | 8/1996 | Gurantz et al. | ............... | 375/340 |
| 5,629,960 A * | 5/1997 | Dutkiewicz et al. | ......... | 375/346 |
| 5,712,870 A * | 1/1998 | Petrick | ........................ | 375/147 |
| 5,805,017 A * | 9/1998 | Razzell | ........................ | 329/300 |
| 5,809,086 A * | 9/1998 | Ariyavisitakul | ............. | 375/332 |
| 5,844,950 A * | 12/1998 | Aono et al. | .................. | 375/346 |
| 5,920,555 A * | 7/1999 | Hulbert | ....................... | 370/342 |
| 5,963,603 A * | 10/1999 | Li et al. | ....................... | 375/355 |
| 6,278,727 B1 * | 8/2001 | Yanagi | ........................ | 375/150 |
| 6,320,917 B1 * | 11/2001 | Stott et al. | ................... | 375/344 |
| 6,411,661 B1 * | 6/2002 | Nguyen et al. | .............. | 375/336 |
| 6,456,677 B1 * | 9/2002 | Hiramatsu et al. | .......... | 375/354 |
| 6,567,480 B1 * | 5/2003 | Brardjanian et al. | ........ | 375/331 |
| 6,570,722 B2 * | 5/2003 | Yokozawa et al. | ............. | 360/2 |
| 6,621,857 B1 * | 9/2003 | Belotserkovsky et al. | ... | 375/149 |
| 6,643,321 B1 * | 11/2003 | Genossar et al. | ............ | 375/219 |
| 6,879,646 B2 * | 4/2005 | Arambepola | ................ | 375/326 |
| 6,925,108 B1 * | 8/2005 | Miller et al. | ................ | 375/150 |
| 7,079,604 B1 * | 7/2006 | Miller et al. | ................ | 375/343 |

(Continued)

FOREIGN PATENT DOCUMENTS

KR    2001-40791    5/2001

(Continued)

*Primary Examiner*—Emmanuel Bayard
(74) *Attorney, Agent, or Firm*—Lowe Hauptman Ham & Berner LLP (57) ABSTRACT

Disclosed is a synchronization system in digital communication, which comprises a converter for receiving signals from a transmitter, and oversampling a single symbol interval into a plurality of subsamples; a signal processor for classifying each symbol oversampled by the converter into a subsample group according to a sample phase, and performing signal processing to adjust processing speeds; an integrator for removing noise from the signals output by the signal processor and performing integration during a predetermined time; and a timing selector for selecting an optimal symbol synchronization point from among values output by the integrator, generating a symbol timing signal and outputting it.

8 Claims, 7 Drawing Sheets

U.S. PATENT DOCUMENTS

2001/0007480 A1* 7/2001 Hong et al. .................. 348/725
2002/0051487 A1* 5/2002 Yamada et al. .............. 375/232
2002/0090923 A1* 7/2002 Muramoto ............... 455/192.2
2003/0053550 A1* 3/2003 Peyla et al. ................. 375/267

FOREIGN PATENT DOCUMENTS

KR   1020010051600   6/2001

* cited by examiner

DIGITAL COMMUNICATION SYNCHRONIZATION SYSTEM AND METHOD THEREOF

BACKGROUND OF THE INVENTION (a) Field of the Invention

The present invention relates to a synchronization system and method thereof in digital communication. More specifically, the present invention relates to a synchronization system and method thereof in digital communication for easy hardware implementation and reduction of effects caused by channels or noise, and thereby obtaining better synchronization performance.

(b) Description of the Related Art

In order to normally transmit and receive data between a transmitter and a receiver in a digital communication system, successful synchronizing is required. Synchronization transmission methods in digital communication systems are classified into frequency synchronization, symbol synchronization, and frame synchronization.

In particular, the symbol synchronization transmission method is divided into two methods according to symbol types. First, when a zero-crossing occurs in a single symbol period, the symbol synchronization transmission method that transmits clock timing signals through the symbol type uses the zero-crossing to adjust symbol synchronization.

In this symbol synchronization transmission method, a waveform is referred to as a return-to-zero (RZ), and it has poor frequency performance.

Next, the symbol synchronization transmission method using a non-return-to-zero (NRZ) waveform has good frequency performance since it does not directly load the timing signals on the symbols, but it requires an additional synchronization circuit.

A receiving end of the digital communication system performs the symbol synchronization through an early-late gate method that compares values output by an early integrator and a late integrator having a marginal time difference within a single symbol period to perform a symbol synchronization process.

Since the early-late gate method performs the symbol synchronization using closed loop control, it is difficult to select control parameters, and since the performance or stability of the loop depends upon the parameter values, it is difficult to implement the method.

To compensate for these problems, U.S. Pat. Nos. 4,794,624 and 5,241,545 disclose methods for using an oversampling method instead of the closed loop control method.

First, the method for clock synchronization of a signal receiver of the U.S. Pat. No. 4,794,624 relates to a digital communication system's receiving end for obtaining the symbol synchronization for demodulating digital signals.

That is, the above-disclosed patent comprises an analog/digital converter, a symbol sign estimator, a subtractor, a square-law unit, an integrator, and a comparator. A receiving end receives band-limited signals from a transmitting end and oversamples a single symbol period into a plurality of subsamples, calculates distribution values at each sample point of the symbol, and the comparator then determines an optimized synchronization point.

In this case, since the symbol sign estimator estimates a symbol sign of a signal previously received for symbol synchronization, the performance of the system may be lowered because of noise.

Also, since a multiplier used for the square-law unit uses much time in the clock signal synchronization method of the signal receiver, it is not appropriate for use in a high-fast communication system.

U.S. Pat. No. 5,241,545, entitled "Apparatus and method for receiving a time-varying signal using multiple sampling points" relates to symbol synchronization acquisition and maintenance in a digital packet communication system.

For this, the patent comprises an analog/digital converter, a data buffer, and a correlator, and finds correlation values of as many as the number of those oversampled for each symbol interval between a receiving signal and a reference signal, and selects the maximum correlation value as the synchronization point.

The above-described apparatus and method periodically repeats the above process to maintain the synchronization in a single packet, but it has a problem in that its hardware becomes complex because of the buffer or the correlator, and the data transmission rate becomes lowered because of overloads at the point where time-varying of a channel is less.

Also, in order to find the correlation value, a random signal is to be used as a synchronization code, but since the random signal has bad fading channel characteristics, an initial correlation performance may be lowered.

Therefore, since the apparatus and method uses a specific synchronization code to find the correlation value, the apparatus and method lowers performance of the symbol synchronization in a frequency-selective fading channel.

Since the above US patents use a square-law unit, a subtractor, a buffer, or a correlator in a symbol synchronization block, its corresponding hardware configuration becomes complex, and since their processing speed is limited, they are not appropriate for high-speed data transmission.

SUMMARY OF THE INVENTION

It is an object of the present invention to provide a synchronization system and method in digital communication for performing symbol synchronization between a transmitter and a receiver without using additional synchronization codes to reduce effects caused by channels or noise, and to improve synchronization performance.

It is another object of the present invention to provide a synchronization system and method in digital communication for configuring a receiver's hardware in a simpler way to improve a processing speed and thereby enable high-speed data transmission.

In one aspect of the present invention, a synchronization system in digital communication comprises: a converter for receiving signals from a transmitter, and oversampling a single symbol interval into a plurality of subsamples; a signal processor for classifying each symbol oversampled by the converter into a subsample group according to a sample phase, and performing signal processing to adjust processing speeds; an integrator for removing noise from the signals output by the signal processor and performing integration during a predetermined time; a timing selector for selecting an optimal symbol synchronization point from among values output by the integrator, generating a symbol timing signal and outputting it; and a digital demodulator for receiving the symbol timing signal from the signal processor and the timing selector, generating a demodulation signal and outputting it.

In another aspect of the present invention, a synchronization method in digital communication comprises: (a) receiving a signal from a transmitter, and oversampling a single symbol interval into a digital signal having a plurality of subsamples; (b) classifying the oversampled signal in (a) into a subsample group according to a sample phase within a single symbol, and performing signal processing to adjust a processing speed; and (c) removing noise from the signal-processed signal in (b), and performing integration during a predetermined interval, and selecting an optimal symbol synchronization point.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
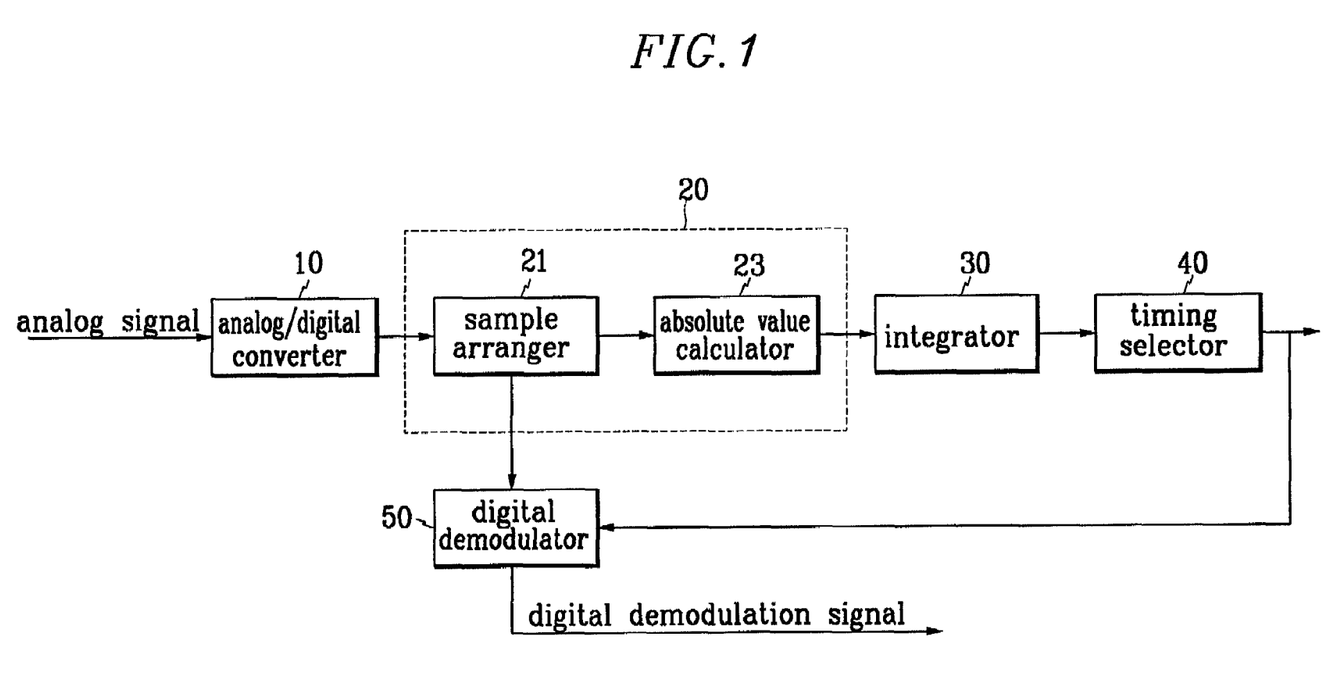
FIG. 1 shows a block diagram of a configuration of a synchronization system in digital communication according to a first preferred embodiment of the present invention.

FIG. 1 shows a block diagram of a configuration of a synchronization system in digital communication according to a first preferred embodiment of the present invention.

As shown, the synchronization system comprises: an analog/digital converter 10 for receiving an analog signal from a transmitter, and oversampling a symbol interval of the signal into a digital signal having a plurality of subsamples; a signal processor 20 for classifying each symbol oversampled by the analog/digital converter 10 into a subsample group according to sample phases, and performing signal processing to adjust processing speeds; an integrator 30 for performing integration during a predetermined time to remove noise from the signals output by the signal processor 20; a timing selector 40 for selecting an optimal symbol synchronization point from among values output by the integrator 30, generating a symbol timing signal and outputting it; and a demodulator 50 for receiving the symbol timing signal from the signal processor 20 and the timing selector 40, generating a digital demodulation signal, and outputting it.

In this instance, the analog/digital converter 10 converts the analog signal received from the transmitter into a digital discrete signal, and oversamples the same to have at least two samples for each symbol, and the sampling frequency used in this case controls the system's resolution and performance.

That is, if the sampling frequency of the analog/digital converter 10 is higher, more accurate symbol synchronization can be adjusted.

The system according to the present invention simply selects an optimal synchronization point without controlling the analog part, and accordingly, the narrower the sampling interval, the better the system performance achieved.

Figure 2A:
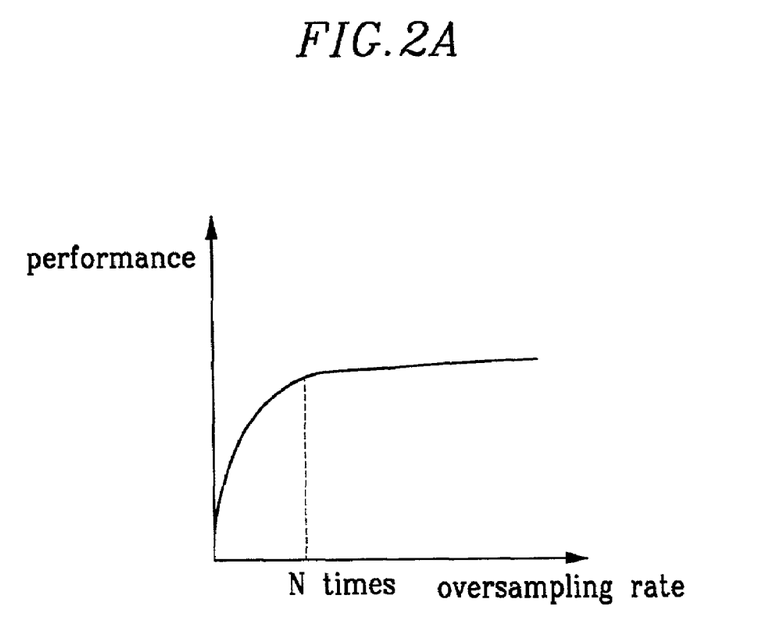
FIG. 2(a) shows a graph of oversampling rates vs. performance for setting a sampling frequency of an analog/digital converter of FIG. 1.
Figure 2B:
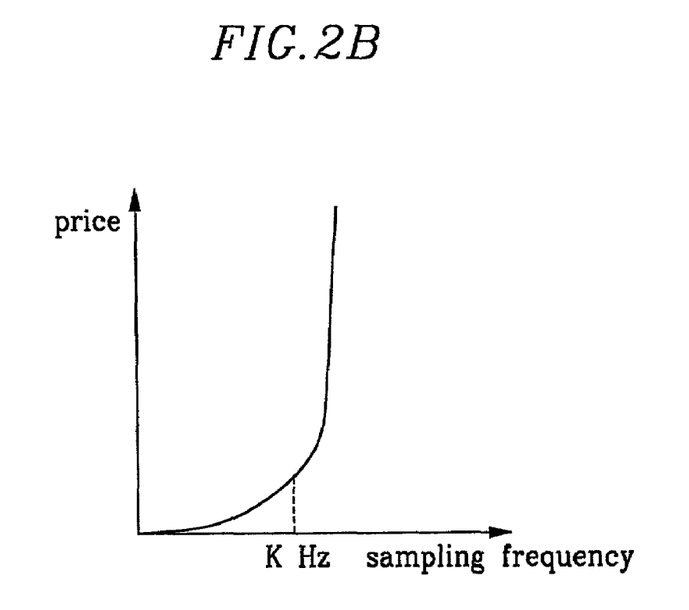
FIG. 2(b) shows a graph of sampling frequencies vs. price of an analog/digital converter of FIG. 1.

FIG. 2(a) shows a graph of oversampling rates vs. performance for setting a sampling frequency of an analog/digital converter of FIG. 1, and FIG. 2(b) shows a graph of sampling frequencies vs. price of an analog/digital converter of FIG. 1.

As shown in FIG. 2(a), if the oversampling rate becomes greater than N times, the performance is not much improved, and when the sampling frequency becomes greater than several kHz, it greatly increases costs.

Hence, it is important to find an appropriate sampling frequency of the analog/digital converter 10 after considering its economy and performance.

The signal processor 20 comprises: a sample arranger 21 for classifying the oversampled signal output by the analog/digital converter 10 into a subsample group according to a sample phase within the symbol; and an absolute value calculator 23 for converting the subsample values output by the sample arranger 21 into absolute values to improve processing speeds.

Figure 3:
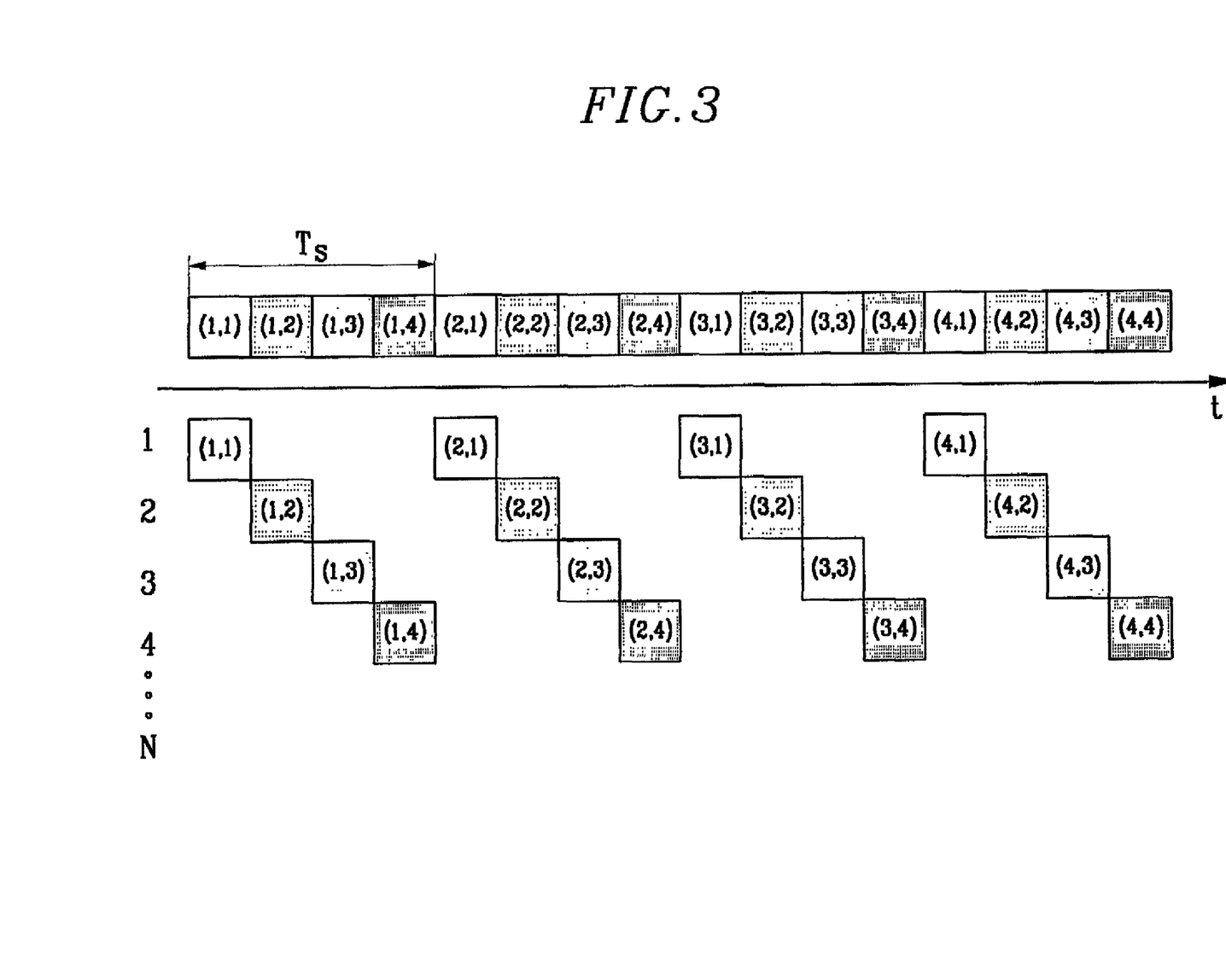
FIG. 3 shows symbol/sample relations on the time axis according to a first preferred embodiment of the present invention.

FIG. 3 shows symbol/sample relationships on the time axis according to a first preferred embodiment of the present invention.

As shown, when the oversampled signal output by the analog/digital converter 10 is oversampled N times, the sample arranger 21 divides the signal into a first, second, ... , Nth sample group according to the sample position of each symbol.

In this instance, the respective sample groups are sets that have one symbol period (Ts) and have the same phase. When one symbol is oversampled N times by the analog/digital converter 10, it has N subsamples, and each subsample has a different phase according to its position for each symbol, and an optimal symbol synchronization point exists among them.

The integrator 30 adds the sample signals depending on the respective phases output by the absolute value calculator 23 during a predetermined time and accumulates them, and an integration interval is N times of a symbol interval.

In general, the noise generated at the communication system influences to the system's performance. The respective samples oversampled by the analog/digital converter 10 have desired signals and noise.

The noise in the samples has a zero average value, and their magnitudes depend on distribution values. That is, a sample value of an instant may have a value other than zero, but when the sample values are added during an interval, the effects that the average value of the noise gives to signal levels can be ignored, and accordingly, in the case of determining the signal received from the transmitter, the noise effects can be excluded.

Therefore, the integrator 30 functions as a low pass filter (LPF), corresponding to a loop filter used for conventional closed loop control methods.

The timing selector 40 selects a point having a maximum value from among the values output by the integrator 30 to use symbol synchronization, and a symbol timing signal selected in this manner is input to the digital demodulator 50 and is used for generating a digital demodulation signal.

Figure 4:
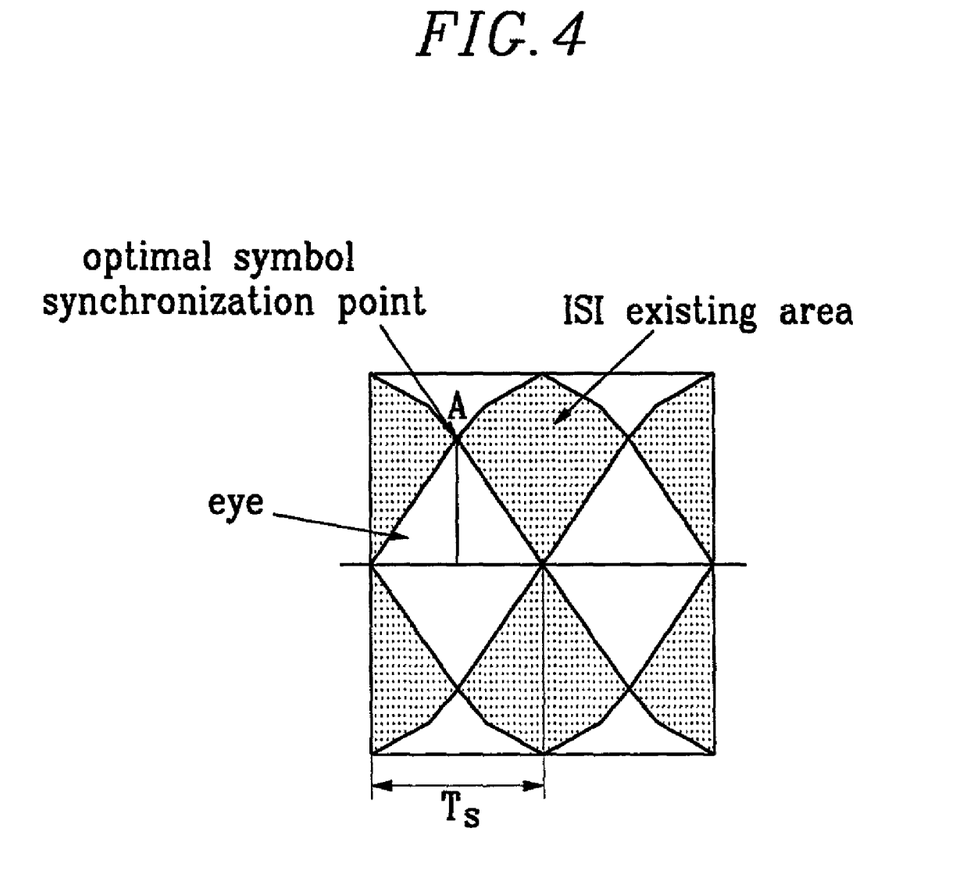
FIG. 4 shows an eye diagram of a band-limited signal according to a first preferred embodiment of the present invention.

FIG. 4 shows an eye diagram of a band-limited signal according to a first preferred embodiment of the present invention.

As shown, the optimal symbol synchronization points is the point A where the eye is opened most widely, and the timing selector 40 selects the point A to use for the symbol synchronization.

When considering only the case of a positive (+) sign since the eye diagram is symmetric with respect to the horizontal axis, the point that has the maximum integration value when executing integration at each sample point during a predetermined interval is the point A where the eye is most widely opened, and accordingly, it is found that the point A is the optimal symbol synchronization point.

Figure 5:
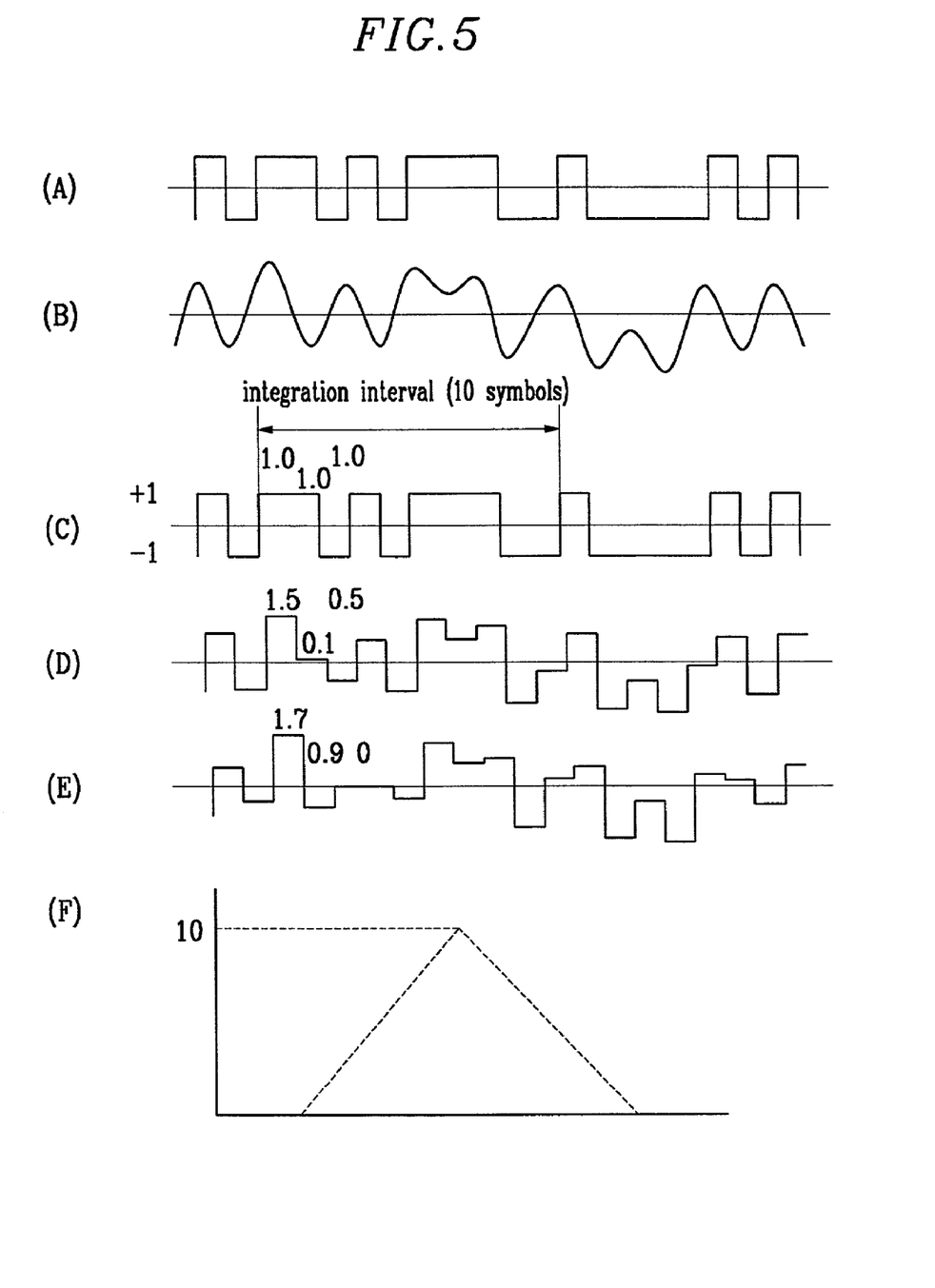
FIG. 5 shows various signal waveforms generated by a digital communication synchronization system according to a first preferred embodiment of the present invention.

FIG. 5 shows various signal waveforms generated by a digital communication synchronization system according to a first preferred embodiment of the present invention.

Referring to FIG. 5, (A) shows transmission data generated by a transmitter, (B) shows a band-limited signal received at a receiver, (C) shows receiving data and the integration value of 10 when the symbol synchronization is correct, (D) shows the receiving data and the integration value of 8.55 when a symbol synchronization error occurs because of a generation of a ¼ sampling error, (E) shows the receiving data and the integration value of 7.22 when a symbol synchronization error occurs because of a generation of a ½ sampling error, and (F) shows the integration values of (C), (D), and (E), and output integration values of the integrator 30 for each sample point. The (F) is matched with the case where the eye of the eye diagram of FIG. 4 is opened.

As a result, the output of the integration values for each sample point has an isosceles triangle form having the optimal symbol synchronization point as the maximum value.

In other points excluding the optimal symbol synchronization point, inter-symbol interference (ISI) generated at adjacent symbols exists. If received bits of positive and negative signs are respectively generated in the identical probability, the ISI does not influence the average value of the integration values after the integrator 30 performs integration during a predetermined interval.

That is, since the average value of a random binary sequence is zero, all components that interfere with the adjacent symbols function as additional components in the integrator's output characteristics curve for a predetermined interval. These additional components have features such as Gaussian noise that has a uniform power and an average value of zero.

Figure 6:
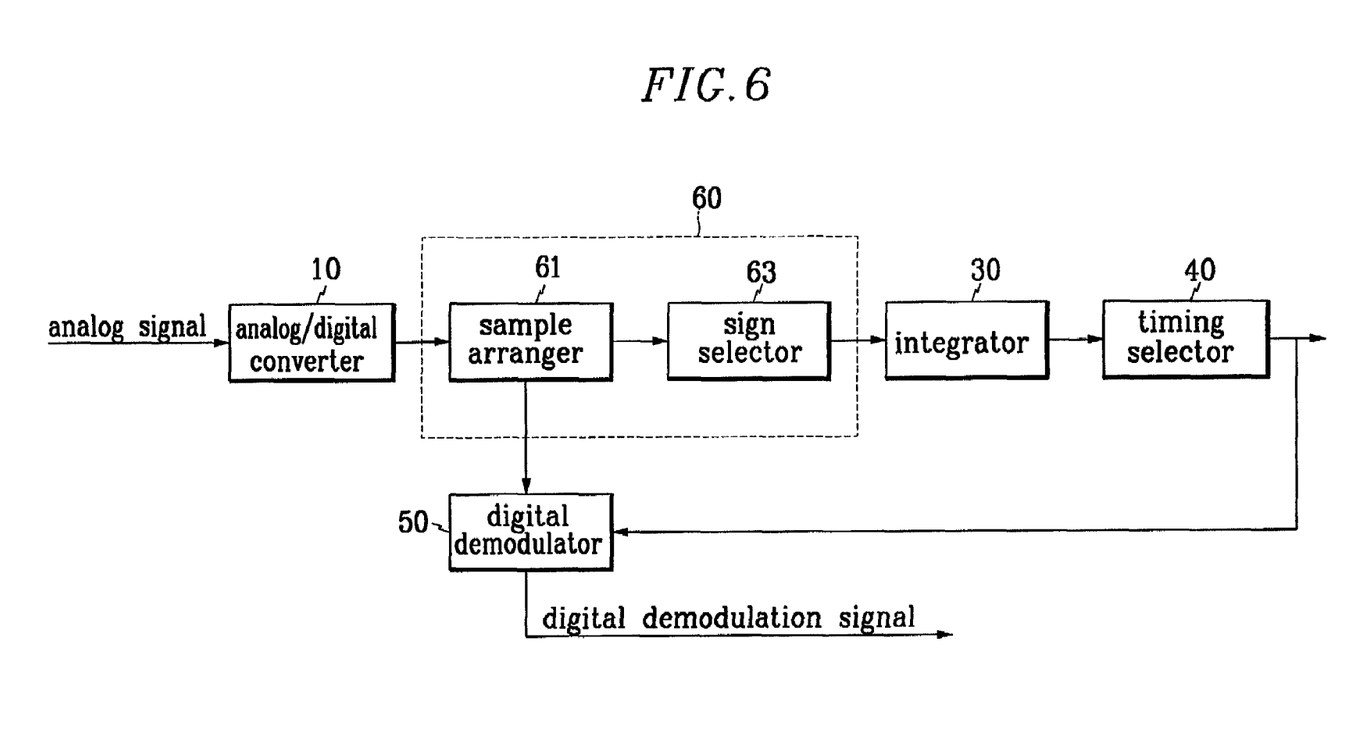
FIG. 6 shows a block diagram of a configuration of a synchronization system in digital communication according to a second preferred embodiment of the present invention.

FIG. 6 shows a block diagram of a configuration of a synchronization system in digital communication according to a second preferred embodiment of the present invention. The units that have functions identical with those of FIG. 1 have reference numerals identical to those used in FIG. 1.

As shown in FIG. 6, the signal processor 60 comprises a sample arranger 61, and a sign selector 63 for selecting signals having only the positive sign from among signals output by the sample arranger 61 since the processing speed can be easily improved by manipulating the most significant bit (MSB) of digital values having a sign.

An operation of the synchronization system in digital communication will now be described in detail.

Figure 7:
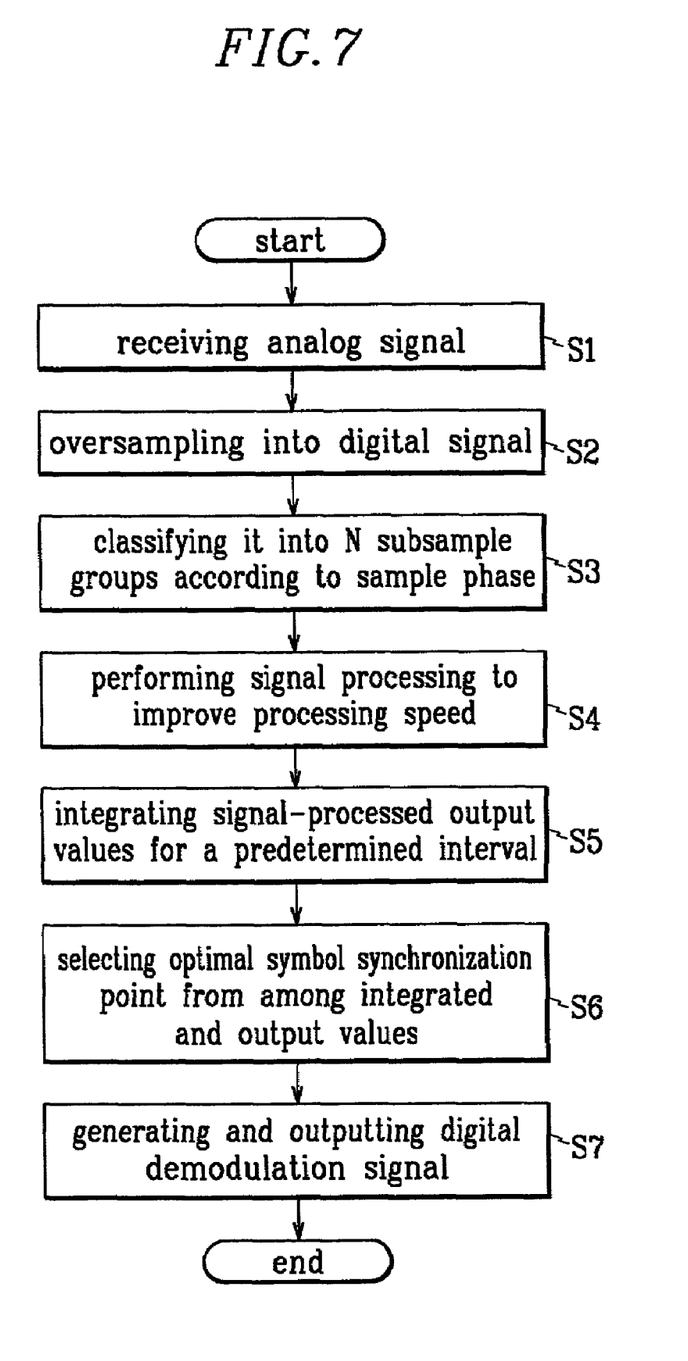
FIG. 7 shows a flowchart of a synchronization method in digital communication in a block diagram of a configuration of a synchronization system in digital communication according to the preferred embodiment of the present invention.

FIG. 7 shows a flowchart of a synchronization method in digital communication according to the preferred embodiment of the present invention.

As shown, when the transmitter of the digital communication system outputs analog signals, the receiver receives the analog signals from the transmitter in step S1, and the analog/digital converter 10 oversamples the signals into digital signals having a plurality of subsamples in a single symbol interval in step S2.

In this instance, the analog/digital converter 10 oversamples the signals so that they may have four subsamples for each symbol by an appropriate sampling frequency as shown in FIG. 3 by considering the economy and performance.

The sample arrangers 21 and 61 classify the oversampled signal output by the analog/digital converter 10 into a subsampled group according to a sample phase within the symbol. When the signal is oversampled N times, the sample arrangers 21 and 61 divide the signal into N sample groups in step S3.

In this instance, each subsample group has a single period and is a set having a same phase.

The respective subsamples values output by the sample arrangers 21 and 61 are signal-processed to improve the processing speed in step S4 by converting the subsample values into absolute values by using the absolute value calculator 23 as shown in FIG. 1, or by selecting the signals having only the positive sign from among the subsample values by using the sign selector 63 as shown in FIG. 6.

The integrator 30 adds the sample signals signal-processed and output by the signal processors 20 and 60 for each phase for a predetermined time, and accumulates them in step S5. The timing selector 40 selects the maximum value from among the values accumulated and output by the integrator 30, generates a symbol timing signal, outputs it, and sets the symbol timing signal as an optimal symbol synchronization point to use for the symbol synchronization in step S6.

The digital demodulator 50 receives the symbol timing signal from the timing selector 40, generates a digital demodulation signal, and outputs it in step S7.

According to the synchronization system and method of digital communication, since no additional synchronization code is used, the signal received from the transmitter is passed through the analog/digital converter, and a corresponding optimal symbol synchronization point is determined, the synchronization resolution increases in proportion to the resolution of the analog/digital converter, effects by channels or noise are reduced, synchronization performance is improved, and its application range is widened.

Also, since the present invention only uses an absolute value calculator or a sign selector, the receiver's hardware configuration becomes simpler and corresponding operation's stability and economy are guaranteed, and since computation time is greatly reduced, the processing speed is improved to enable high-speed data transmission.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A synchronization system in digital communication, comprising:

a converter for receiving signals from a transmitter, and oversampling a single symbol interval into a plurality of subsamples;

a signal processor for classifying each symbol oversampled by the converter into a subsample group according to a sample phase, and performing signal processing to adjust processing speeds;

an integrator for removing noise from the signals output by the signal processor and performing integration during a predetermined time; and a timing selector for selecting an optimal symbol synchronization point from among values output by the integrator, generating and outputting a symbol timing signal.

2. The synchronization system of claim 1, further comprising a digital demodulator for receiving the symbol timing signal from the signal processor and the timing selector, generating and outputting a demodulation signal.

3. The synchronization system of claim 1, wherein the signal processor comprises:

a sample arranger for classifying the oversampled signal output by the converter into a subsample group according to a sample phase within the symbol; and an absolute value calculator for converting the subsample values output by the sample arranger into absolute values.

4. The synchronization system of claim 1, wherein the signal processor comprises:

a sample arranger for classifying the oversampled signal output by the converter into a subsample group according to a sample phase within the symbol; and a sign selector for selecting signals having only either sign from among respective subsample values having positive and negative signs, the subsample values being output by the sample arranger.

5. A synchronization method in digital communication, comprising:

(a) receiving a signal from a transmitter, and oversampling a single symbol interval into a digital signal having a plurality of subsamples;

(b) classifying the oversampled signal in (a) into a subsample group according to a sample phase within a single symbol, and performing signal processing to adjust a processing speed; and (c) removing noise from the signal-processed signal in (b), and performing integration during a predetermined interval, and selecting an optimal symbol synchronization point.

6. The synchronization method in claim 5, wherein (c) comprises selecting the optimal symbol synchronization point, and generating and outputting a digital demodulation signal using the selected signal.

7. The synchronization method in claim 5, wherein the signal processing in (b) converts subsample values that are output after they are classified into the subsample group into absolute values.

8. The synchronization method in claim 5, wherein the signal processing in (b) selects signals having an either sign from among subsample values having positive and negative signs, subsample values being output after being classified into the subsample group.

* * * * *